US011148227B2

(12) United States Patent
Nauka et al.

(10) Patent No.: US 11,148,227 B2
(45) Date of Patent: Oct. 19, 2021

(54) LASER MELTING OF BUILD MATERIALS (71) Applicant: Hewlett-Packard Development Company, L.P., Houston, TX (US)

(72) Inventors: Krzysztof Nauka, Palo Alto, CA (US); Tom Anthony, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 236 days.

(21) Appl. No.: 16/098,104

(22) PCT Filed: Jul. 29, 2016

(86) PCT No.: PCT/US2016/044853
§ 371 (c)(1),
(2) Date: Oct. 31, 2018

(87) PCT Pub. No.: WO2018/022107
PCT Pub. Date: Feb. 1, 2018

(65) Prior Publication Data
US 2019/0134750 A1 May 9, 2019

(51) Int. Cl.
*B23K 26/34* (2014.01)
*B33Y 10/00* (2015.01)
*B33Y 30/00* (2015.01)
*B23K 26/342* (2014.01)
*B33Y 50/02* (2015.01)
(Continued)

(52) U.S. Cl.
CPC ........ *B23K 26/342* (2015.10); *B23K 26/0006* (2013.01); *B23K 26/034* (2013.01); *B23K 26/062* (2015.10); *B23K 26/1464* (2013.01);
*B23K 26/702* (2015.10); *B29C 64/153* (2017.08); *B29C 64/268* (2017.08); *B29C 64/295* (2017.08); *B29C 64/393* (2017.08); *B33Y 10/00* (2014.12); *B33Y 30/00* (2014.12);
(Continued)

(58) Field of Classification Search
CPC .. B33Y 10/00; B33Y 30/00; B23K 26/34–342
See application file for complete search history.

(56) References Cited

U.S. PATENT DOCUMENTS 8,636,496 B2   1/2014  Das et al.
10,537,966 B2* 1/2020  Sasaki ............... B23K 15/0026
(Continued)

FOREIGN PATENT DOCUMENTS

CN   103374223 A   10/2013
EP   1736272 A1   12/2006
(Continued)

*Primary Examiner* — Michael A Laflame, Jr.
(74) *Attorney, Agent, or Firm* — HPI Patent Department (57) ABSTRACT

According to an example, an apparatus may include a heating lamp to illuminate and heat an area of a layer of build materials, in which the build materials may be one of a metallic and a plastic powder. The apparatus may also include a laser source to generate a laser beam and a controller to control the heating lamp to heat the build materials in the area of the layer of build materials to a temperature that is between about 100° C. to about 400° C. below a temperature at which the build materials begin to melt and to control the laser source to output a laser beam to melt the build materials in a portion of the heated area of the layer of build materials.

15 Claims, 4 Drawing Sheets

(51) Int. Cl.
    *B29C 64/153*       (2017.01)
    *B29C 64/393*       (2017.01)
    *B29C 64/295*       (2017.01)
    *B23K 26/062*       (2014.01)
    *B23K 26/70*        (2014.01)
    *B29C 64/268*       (2017.01)
    *B23K 26/00*        (2014.01)
    *B23K 26/03*        (2006.01)
    *B23K 26/14*        (2014.01)
    *B33Y 40/00*        (2020.01)
    *B23K 103/16*       (2006.01)

(52) U.S. Cl.
    CPC ........ B33Y 50/02 (2014.12); *B23K 2103/172* (2018.08); *B33Y 40/00* (2014.12)

(56) References Cited

U.S. PATENT DOCUMENTS

| | | | |
|---|---|---|---|
| 2004/0104499 A1 | 6/2004 | Keller | |
| 2006/0065640 A1* | 3/2006 | Lizotte | B23K 26/0622 219/121.61 |
| 2008/0262659 A1 | 10/2008 | Huskamp | |
| 2013/0274435 A1 | 10/2013 | Wolfgang et al. | |
| 2014/0227783 A1* | 8/2014 | Masutani | C12N 5/0062 435/397 |
| 2014/0265047 A1* | 9/2014 | Burris | B23K 26/0608 264/497 |
| 2015/0306667 A1 | 10/2015 | Yao | |
| 2015/0328835 A1* | 11/2015 | Wu | B22F 3/1055 264/642 |
| 2016/0375491 A1* | 12/2016 | Swaminathan | B29C 64/295 419/53 |
| 2017/0050268 A1* | 2/2017 | Fujiya | B23K 26/342 |
| 2017/0197278 A1* | 7/2017 | Garry | B33Y 80/00 |

FOREIGN PATENT DOCUMENTS

| | | |
|---|---|---|
| WO | WO-2015/079839 | 6/2015 |
| WO | WO-2015/109102 | 7/2015 |
| WO | WO-2015136277 A1 | 9/2015 |
| WO | WO-2016007672 A1 | 1/2016 |
| WO | WO-2016010536 A1 | 1/2016 |
| WO | WO-2016048348 | 3/2016 |
| WO | WO-2016049621 A1 | 3/2016 |
| WO | WO-2016068899 A1 | 5/2016 |

\* cited by examiner

LASER MELTING OF BUILD MATERIALS

BACKGROUND

In three-dimensional ("3D") printing using selective laser melting ("SLM") processes, a high-power laser beam is used to create three-dimensional parts or objects by melting together fine powder particles to each other and to surrounding portions of the powder particles. That is, the temperature of the powder in each successive small area is raised to the melting temperature of the powder by the energy of the applied laser beam. The SLM process is an additive manufacturing process where a 3D object is built by addition of melted and fused layers of powder, as opposed to other object generation processes that rely on removing material in order to create the 3D object.

BRIEF DESCRIPTION OF THE DRAWINGS

Features of the present disclosure are illustrated by way of example and not limited in the following figure(s), in which like numerals indicate like element, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Selective laser melting (SLM) is a process used for 3D printing of metal and of some high temperature plastic objects. SLM typically relies on irradiation of a small area of the metal (or plastic) powder bed kept at, or close to, room temperature with an intense laser beam causing formation of a localized molten spot with an area slightly exceeding the laser beam cross section and depth, which are typically between 20 microns and 100 microns. As the laser beam is steered to each new position, the laser beam leaves behind freshly solidified spot of previously molten material. A rastering movement of the laser beam combined with deposition of subsequent powder layers may facilitate formation of extended 3D solid objects. The typical speed of rastering the laser beam may be of the order of a few meters/second.

In SLM processes, the laser beam heats almost instantaneously a small irradiated region from ambient room temperature to above the melting point of the powder. The Gaussian-like laser beam energy distribution, combined with enormous heat loss to the surrounding ambient and adjacent powder particles, makes the heating non-uniform. This heating problem may further be exacerbated by the grainy nature of the powder to be melted resulting in local hot and cold spots within the laser irradiated region in the powder, which may lead to thermal stresses appearing as the laser spot moves away and the irradiated region begins to solidify. The large temperature gradients and associated thermal stresses of SLM processes often require an extensive network of support structures to be affixed to the printed part to remove heat and prevent stress-induced warping. Placement of the support structures is part art and part science. Deciding on an appropriate structural support configuration, density, and placement presents challenges to operators. Inadequate supports may lead to part failure during printing. Further, the support structures must be removed from both the part and base plate after printing, which is a major contributor to significant post-processing costs for SLM processes.

As a laser beam transits from the molten region into the area to be melted, the amount of laser energy needed to maintain continuous and smooth printing process rapidly increases. This can be accommodated by delivering much higher irradiation energy than is required to melt the solid powder, which in turn may cause a significant overheating of already molten material by as much as 2000° C. above the melting point. Increasing the laser irradiation energy may lead to yet other deleterious effects of vaporization of molten powder and airborne powder residues and powder particles from the low end of the powder size distribution. Typical target powder particle size spans range between a few and a few tens of microns. However, due to the nature of particle fabrication and post-fabrication processing, such as filtering with a sieve, the metallic powder particles may have an upper size limit, but may not have a lower size limitation, and some of them fall into the submicron range below the minimum target size. Since particle heating depends on their size, the small particles may end up being heated to a point where they melt and vaporize forming a "smoke" that can interfere with the laser beam irradiation. The smoke produced by the high heating process may be further amplified by the rapidly heated small particles' ambient lifting from the powder's surface, and from other powder residues that can become airborne. In addition, metal vapor pressure at temperatures 1000° C.-2000° C. above the melting point can generate a significant evaporation rate from the source. Additionally, condensation within the vapor plume above the melt pool is yet another source of "smoke."

Disclosed herein are apparatuses and methods for implementing SLM that may not suffer from many of the drawbacks of SLM processes noted above. Instead, the apparatuses and methods disclosed herein may illuminate and heat an area of a layer of build materials to a temperature that is below but relatively near the melting temperature of the build materials. Particularly, the apparatuses disclosed herein may include a heating lamp that is to be apply light onto the area of the build materials that are to be irradiated with a laser beam. The area of the build materials may be relatively larger than the portion of the build materials that are to be irradiated with the laser beam such that the temperature difference between the build materials that are irradiated and the neighboring build materials may be reduced and thus, thermal stresses between these build materials may be reduced.

According to an example, the apparatuses and methods disclosed herein may apply the light in in either a continuous wave or in pulses and for relatively short durations of time. Particularly, the light may be applied to raise the temperature of the build materials in the area for a relatively short period of time during which portions of the area may be irradiated with the laser beam. In this regard, the light may be turned off immediately or at some short time following the laser beam being turned off. By applying light during this time period, the temperature of the build materials may be better controlled and the build materials may be prevented from undesirably sintering or melting.

Through implementation of the apparatuses and methods disclosed herein, the energy necessary for the laser beam to raise the temperature of the build materials to their melting point may be reduced. Further, with the thermal differential between the area of melted and non-melted build materials being relatively small, issues of thermal shock, thermal fracturing, and deformation may be reduced. Moreover, with less energy necessary to raise the temperature of the heated surrounding build materials to the melting temperature, the laser may progress through the SLM process at a speed faster than if the laser was required to raise the temperature of the build materials substantially at each new SLM location.

Figure 1:
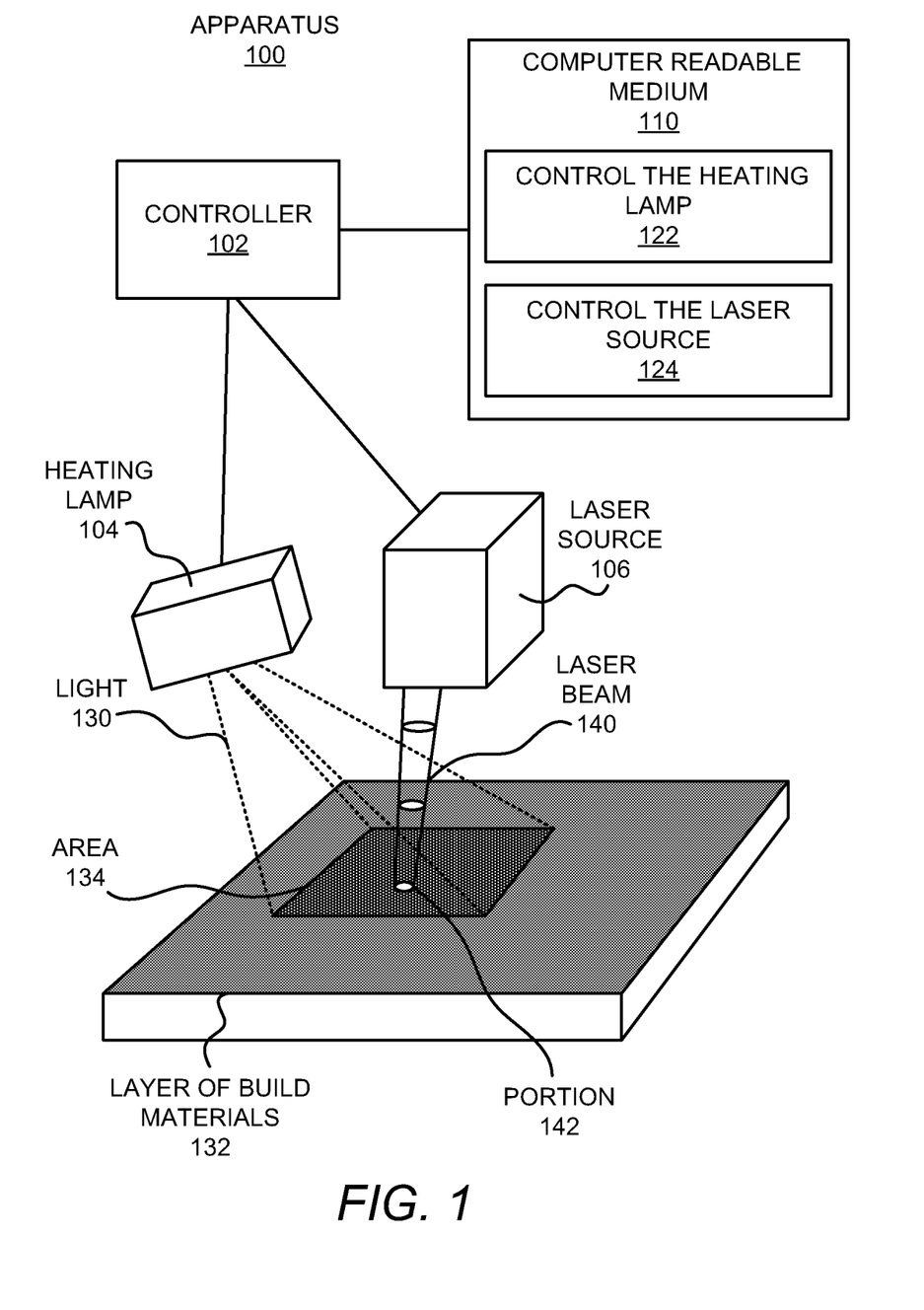
FIG. 1 shows a simplified view of an example apparatus for generating, building, or printing three-dimensional objects through SLM.

With reference first to FIG. 1, there is shown a simplified view of an example apparatus 100 for generating, building, or printing three-dimensional objects through SLM. It should be understood that the apparatus 100 depicted in FIG. 1 may include additional components and that some of the components described herein may be removed and/or modified without departing from a scope of the apparatus 100 disclosed herein.

The apparatus 100 may include a controller 102, a heating lamp 104, a laser source 106, and a computer readable medium 110. The controller 102 may be a computing device, a semiconductor-based microprocessor, a central processing unit (CPU), an application specific integrated circuit (ASIC), and/or other hardware device. The computer readable medium 110 may include instructions 122 and 124 (which may also be termed machine readable instructions) that the controller 102 may execute. More particularly, the controller 102 may fetch, decode, and execute the instructions 122 to control the heating lamp 104 and the instructions 124 to control the laser source 106.

As discussed herein, the controller 102 may control the heating lamp 104 to apply light 130 onto an area 134 of a layer of build materials 132. An area 134 of the layer of build materials 132 upon which the light 130 is irradiated is shown in FIG. 1 and may be significantly smaller than the area of the layer of build materials 132. The controller 102 may control the heating lamp 104 to heat the area 134 to a temperature that is between about 100° C. to about 400° C. below a temperature at which the build materials in the layer 132 begin to melt. According to an example, the build materials are one of a metallic powder and a plastic powder and the temperature to which the build materials in the illuminated area 134 are heated may depend upon the types of metallic powder or plastic powder. The temperature of the build materials may be raised to between about 100° C. to about 400° C. below a temperature at which the build materials begin to melt because this temperature difference may eliminate or reduce a majority of thermal gradient problems associated with SLM processes.

The controller 102 may control the laser source 106 to output a laser beam 140 onto a portion 142 of the area 134 of the layer of build materials 132. The portion 142 of the layer of build materials 132 upon which the laser beam 140 is irradiated may reach a melting temperature and may fuse together when the laser beam 140 is removed from the portion 142. As shown, the area 134 may be larger than the portion 142, for instance, the area 134 may be magnitudes larger than the portion 142 to eliminate potential temperature gradient problems between the build materials in the portion 142 and the build materials outside of the area 134. In addition, the controller 102 may control the laser source 106 to move the laser beam 140 such that the different portions 142 within the illuminated area 134 may be melted and subsequently fused together, e.g., to form a part having a desired shape.

According to an example, the controller 102 may not activate the heating lamp 104 continuously. Instead, the controller 102 may activate the heating lamp 104 immediately before activating the laser source 106 and may deactivate the heating lamp 104 immediately following deactivation of the laser source 106. For instance, the controller 102 may activate the heating lamp 104 about less than a second to about 5 seconds prior to activating laser source 106 and may deactivate the heating lamp 104 about less than a second to about 2 seconds after deactivating the laser source 106. By limiting the duration upon which the build materials are preheated in this manner, there may be a reduction in the possibility that the build materials may become sintered or reach an onset of particle melting while still heating the build materials to a desired temperature.

In some examples, the build materials in the illuminated area 134 may only undergo preheating from the heating lamp 104 for the time during which the laser beam 140 is applied to melt the build materials. In addition, the laser source 106 may be activated during the time that the heating lamp 104 is activated or immediately, e.g., which about tens of milliseconds, following deactivation of the heating lamp 104. However, it has been found that build materials in powder form may exhibit relatively slow thermal decay due to their extremely low thermal conductivity (e.g., Cu k=385 W/m-K, Cu powder k~1.6 W/m-K). As such, the heating lamp 104 may maintain a temperature of the upper few layers of the build materials at a temperature that is hundreds of degrees above ambient for tens of msec after termination of the illumination. In other examples, therefore, the heating lamp 104 and the laser source 106 may be sequentially operated without causing significant differences in build material temperatures.

The heating lamp 104 may be any suitable type of lamp that may be able to increase the temperature of the build materials to between about 100° C. to about 400° C. below a temperature at which the build materials begin to melt and to illuminate an area that is significantly larger than the portion 142 irradiated with the laser beam 140. For instance, the heating lamp 104 may be a xenon lamp, a halogen lamp, or the like. In addition, the heating lamp 104 may be operated as flashing or strobing lamps or continuous wave lamps. Examples of suitable heating lamps 104 may include a laser pumping xenon flash lamp available from Perkin Elmer, Inc. of Watham, Mass., a modulated continuous wave and quasi-continuous xenon lamps available from Perkin Elmer, Inc. of Watham, Mass., short-arc XBO theatrical xenon lamp available from Osram GmbH of Munich, Germany, and pulse xenon sources used for specialty applications available from Xenon Corporation of Wilmington, Mass.

The laser source 106 may be any suitable type of laser beam source that is able to heat the build materials to above their melting temperature. In addition, the laser source 106 may be a laser beam source that is able to generate a laser beam 140 that may irradiate the build materials in the layer 132 to a depth of between about 20 microns and 100 microns. Suitable laser sources 106 may include either or both of continuous wave and pulsed laser sources. Although the apparatus 100 has been depicted as including a single laser source 106, the apparatus 100 may include any number of laser sources to thus simultaneously fuse the same or different portions 142 of the area 134 of build materials 206.

Figure 2:
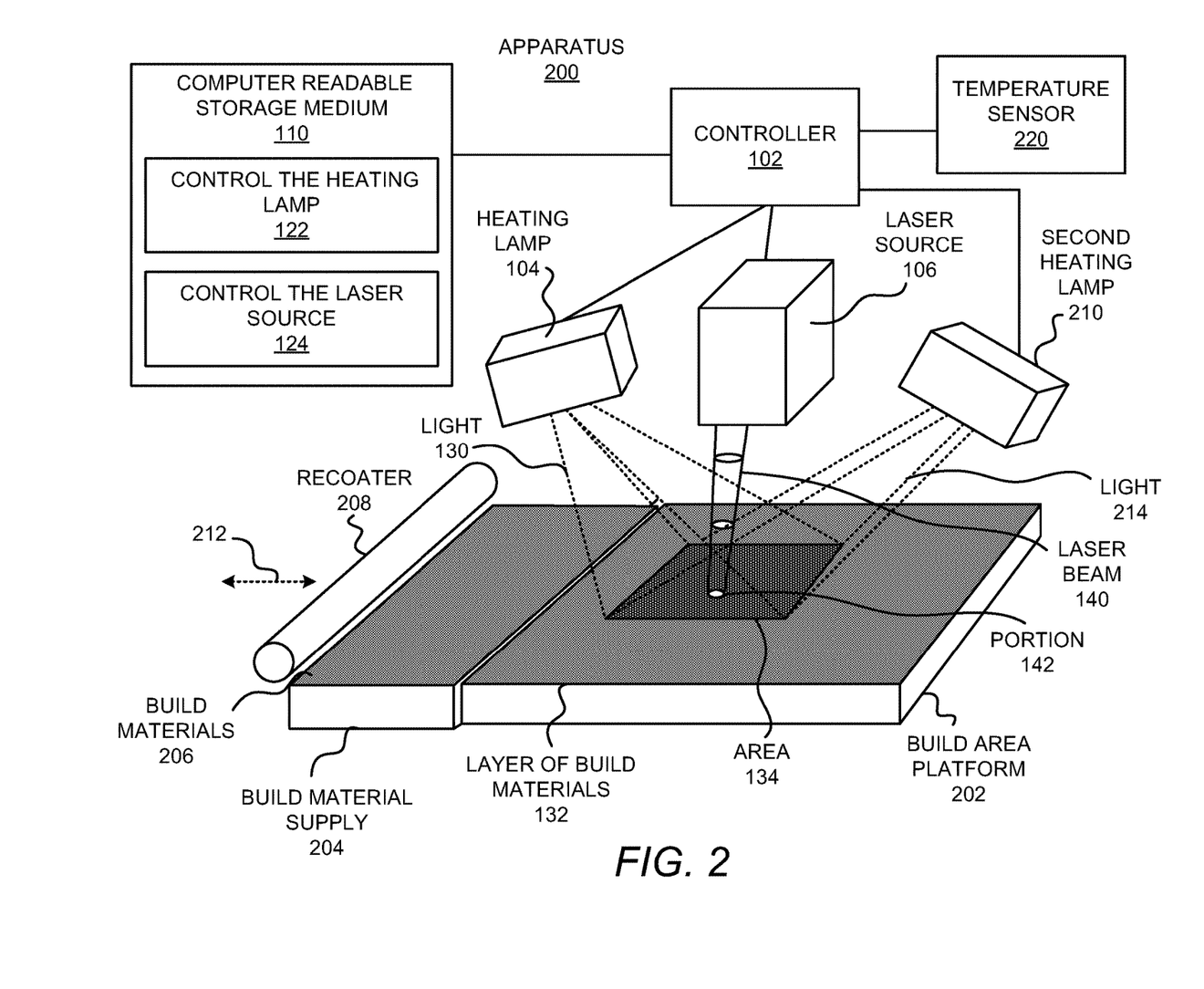
FIG. 2 shows a simplified view of another example apparatus for generating, building, or printing three-dimensional objects through SLM.

Tuning now to FIG. 2, there is shown a simplified view of another example apparatus 200 for generating, building, or printing three-dimensional objects through SLM. The apparatus 200 depicted in FIG. 2 may include all of the same features as those shown in the apparatus 100 depicted in FIG. 1. As such, the common features are not described in detail with respect to the apparatus 200. Generally speaking, the apparatuses 100 and 200 may be each be a 3D printer.

In addition to the components of the apparatus 100, the apparatus 200 may also include a build area platform 202, a build material supply 204, build materials 206, a recoater 208, a second heating lamp 210, and a temperature sensor 220. The build material supply 204 may be a container or surface that may be used to position build materials 206 between the recoater 208 and the build area platform 202. The build material supply 204 may be a hopper or a surface upon which the build materials 206 may be supplied, for instance, from a build material source (not shown) located above the build material supply 204. Additionally, or as another example, the build material supply 204 may include a mechanism to provide, e.g., move, the build materials 206 from a storage location to a position to be spread onto the build area platform 202 or a previously formed layer of build materials 206. For instance, the build material supply 204 may include a hopper, an auger conveyer, or the like. Generally speaking, 3D objects or parts are to be generated from the build materials 206 and the build materials 206 may be in the form of metallic or plastic powder.

The recoater 208 may move in directions as denoted by the arrow 212 over the build material supply 204 and across the build area platform 202 to spread a layer 132 of the build materials 206 over a surface of the build area platform 202. The layer 132 may be formed to a substantially uniform thickness across the build area platform 202. In an example, the thickness of the layer 132 may range from about 90 μm to about 110 μm, although thinner or thicker layers may also be used. For example, the thickness of the layer 132 may range from about 20 μm to about 200 μm, or from about 50 μm to about 200 μm. The recoater 208 may also be returned to a position adjacent the build material supply 204 following the spreading of the build materials 206. The recoater 208 may be a doctor blade, roller, a counter rotating roller or any other device suitable for spreading the build materials 206 over the build area platform 202.

Although not shown, the apparatus 200 may also include heaters to maintain the build materials 206 at an elevated temperature. For instance, heaters may be provided in the build area platform 202 and the build material supply 204. As another example, heaters may be provided to heat the ambient air surrounding the build materials 206. The elevated temperature may be selected to facilitate fusing of the build materials 206 with the laser beam 140 while being sufficiently low to prevent the build materials 206 from unintentionally being sintered or beginning to melt. By way of particular example, the heaters may maintain the build materials 206 on the build area platform 202 at a temperature that is less than about 400° C. below a temperature at which the build materials begin to melt. In another particular example, the heaters may maintain the build materials 206 on the build area platform 202 at a temperature that is less than about 1000° C. below a temperature at which the build materials begin to melt.

The second heating lamp 210 may be similar or identical to the heating lamp 104. In addition, the controller 102 may execute the instructions 122 to control the second heating lamp 210 to output light 214 onto the layer of build materials 132. In one example, the controller 102 may control the heating lamp 104 and the second heating lamp 210 to simultaneously illuminate and heat the illuminated area 134 of the layer of build materials 132. In another example, the controller 102 may control the heating lamp 104 and the second heating lamp 210 to alternatingly illuminate and heat the area 134. For instance, the controller 102 may control the heating lamp 104 to output light 130 during a first time period and may control the second heating lamp 210 to output light 214 during a second time period. The controller 102 may repeat this process until the build materials 206 at the desired locations on the layer of build materials 132 have been melted by the laser source 106.

In an example in which the heating lamps 104, 210 are xenon flash lamps, the heating lamps 104, 210 may recharge during the time periods in which the heating lamps 104, 210 are not outputting light. In this regard, the build materials 206 in the area 134 of the layer of build materials 132 may be maintained at a desired preheated temperature during the time at which the laser source 106 applies the laser beam 140 even though the heating lamps 104, 210 may need to be recharged during that time. Additionally, although two heating lamps 104, 210 have been depicted in FIG. 2, it should be understood that the apparatus 200 may include any number of heating lamps without departing from a scope of the apparatus 200.

The temperature sensor 220 may detect a temperature of the build materials 206 in the layer of build materials 132. The temperature sensor 220 may be a thermistor, a thermocouple, an infrared temperature sensor, or the like. In any regard, the temperature sensor 220 may communicate detected temperature measurements of the build material 206 to the controller 102. The controller 102 may adjust an illumination level of the heating lamp(s) 104, 210, may adjust an energy level of the laser beam 140 outputted from the laser source 106, or both, based upon the detected temperature. For instance, if the temperature of the build materials 206 is below a predefined temperature, the controller 102 may increase the illumination level of the heating lamp(s) 104, 210 such that the build materials 206 in the area 134 are within a predetermined range of temperatures, e.g., within about 100° C. and about 400° C., at which the build materials 206 begin to melt.

Figure 3:
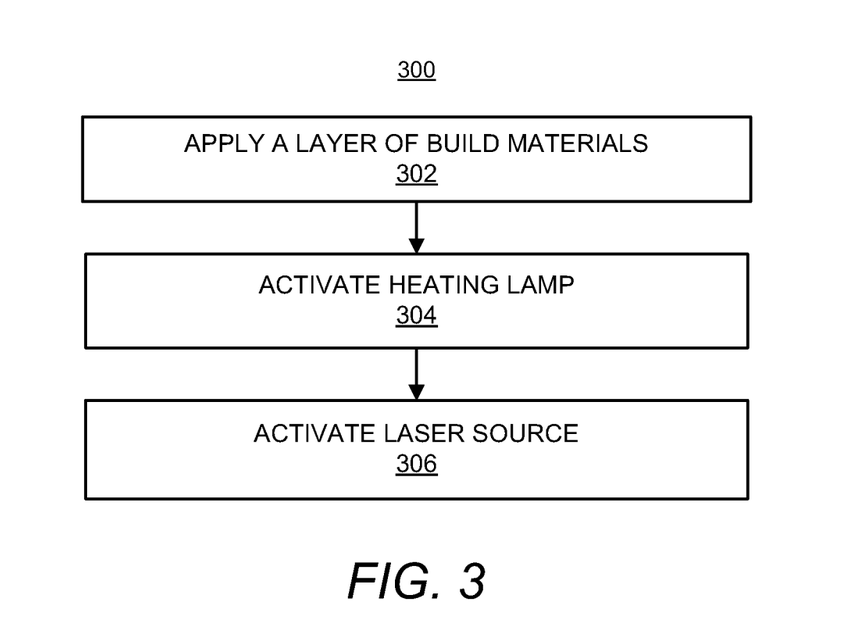
FIGS. 3 and 4, respectively, show flow diagrams of example methods for selective laser melting of build materials.
Figure 4:
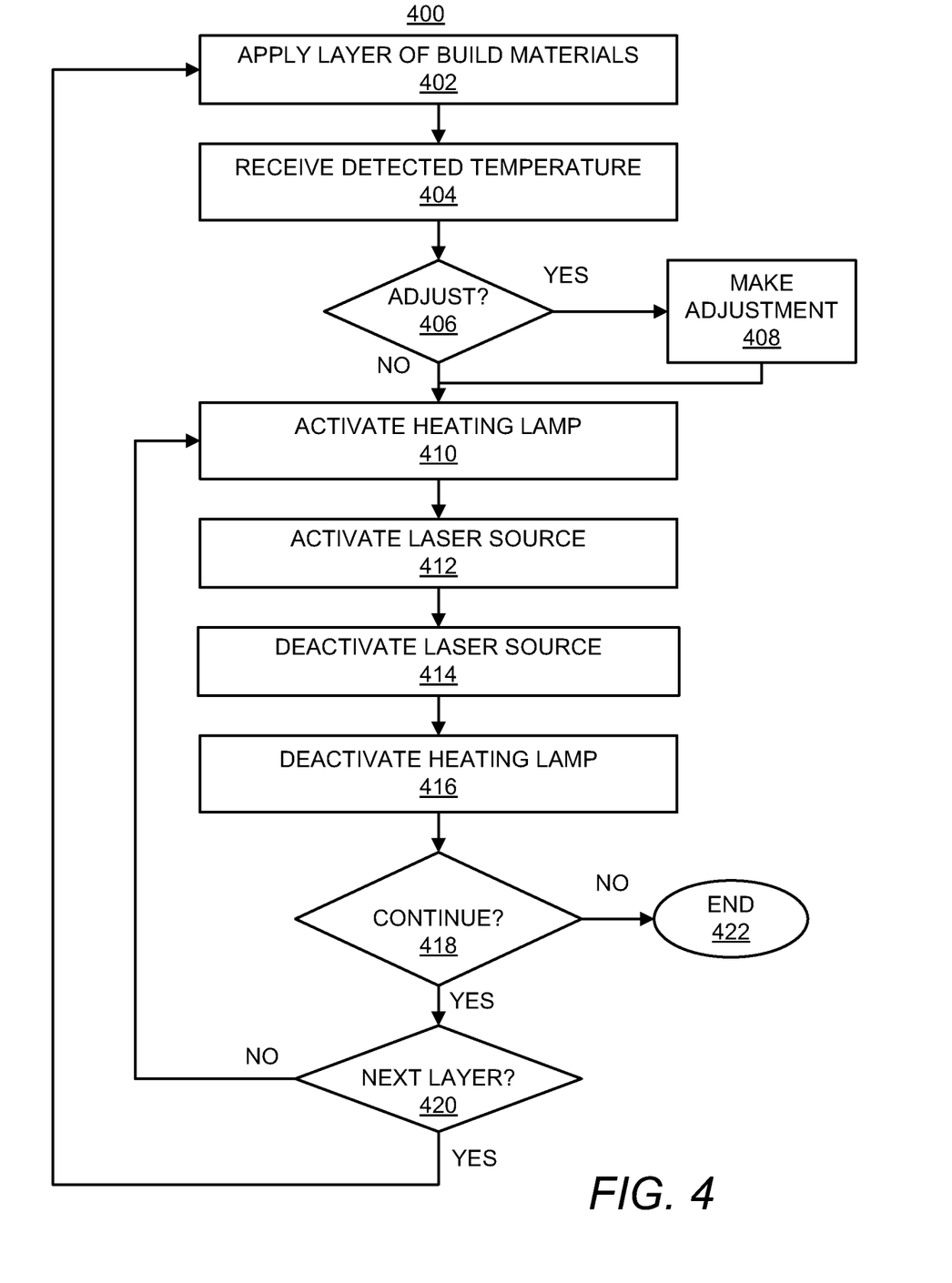

Various manners in which the apparatuses 100, 200 may be implemented are discussed in greater detail with respect to the methods 300 and 400 respectively depicted in FIGS. 3 and 4. Particularly, FIGS. 3 and 4, respectively, depict example methods 300 and 400 for selective laser melting of build materials. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the apparatuses 100 and 200 illustrated in FIGS. 1 and 2 for purposes of illustration. It should, however, be understood that apparatuses having other configurations may be implemented to perform either or both of the methods 300 and 400 without departing from the scopes of the methods 300 and 400.

With reference first to FIG. 3, at block 302, a layer of build materials 132 may be applied over a build area platform 202. For instance, the controller 102 may control the recoater 208 to move some of the build materials 206 in the build material supply 204 over the build area platform 202. The recoater 208 may apply the layer of build materials 132 to have a relatively uniform thickness across the area of the layer of build materials 132. The layer of build materials applied at block 302 may be a first layer on the build area platform 202 or a layer that overlaps a previously applied layer. In any regard, the build materials 206 then be applied layer of build materials 132 may be metallic powder or plastic powder.

At block 304, a heating lamp 104 may be activated to heat an area of the layer of build materials 132 to a temperature of between about 100° C. to about 400° C. below a melting temperature of the build materials 206. For instance, the controller 102 may execute the instructions 122 to control the heating lamp 104 to illuminate an area 134 of the layer of build materials 132 for a predetermined length of time. The controller 102 may also determine the area 134 that is to be illuminated to be larger than an area of the build materials 206 that are to be fused together. According to an example, the heating lamp 104 may be a xenon lamp and the controller 102 may control the heating lamp 104 to output a pulse of illumination, e.g., the pulse of illumination may have a duration of about 15 msec. In another example, the heating lamp 104 may be a xenon lamp or a halogen lamp and the controller 102 may control the heating lamp 104 to apply a continuous wave of illumination onto the area 134.

In addition to controlling the heating lamp 104, the controller 102 may also control the second heating lamp 210 to output light 214 onto the area 134. As discussed herein, the controller 102 may control the heating lamps 104, 210 to simultaneously illuminate the area 134 or to alternatingly illuminate the area 134.

At block 306, the laser source 106 may be activated to apply a laser beam 140 to melt the build materials 206 in the portion 142 of the heated area 134 of the layer of build materials 132. The controller 102 may control the laser source 106 to apply a laser beam 140 onto the portions 142 of the build materials 206 on the layer of build materials 132 that are to be fused together. Thus, for instance, the controller 102 may control the laser source 106 to move the laser beam 140 across portions 142 of the area 134 that the heating lamp 104 or heating lamps 104, 210 illuminate.

According to an example, the duration of time over which the heating lamp(s) 104, 210 and the laser source 106 are activated for a particular area 134 may be relatively short. For instance, the heating lamp(s) 104, 210 may be activated for a sufficiently short period of time to substantially prevent the build materials 206 in the area 134 from sintering or melting. In addition, following irradiation of portions 142 of the area 134, the controller 102 may control the heating lamp 104 to illuminate another area 134 on the layer of build materials 132 and the method 300 may be repeated for the another area 134.

Turning now to FIG. 4, at block 402, a layer of build materials 132 may be applied. The layer of build materials 132 may be applied as discussed above with respect to block 302 in FIG. 3.

At block 404, the controller 102 may receive a temperature of the build materials 206 in the layer of build materials 132. For instance, the temperature sensor 220 may detect the temperature of the build materials 206 and may communicate the detected temperature to the controller 102. The controller 102 may compare the detected temperature with a predefined temperature, e.g., a temperature at which the build materials 206 are intended to be maintained, and may determine whether an adjustment is to be made, as indicated at block 406. The controller 102 may determine that an adjustment is to be made in response to the detected temperature differing from the predefined temperature, e.g., by some predetermined amount that may be user-defined or based upon the build materials 206. The adjustment may be to increase or decrease the temperature of the build materials 206 in the area 134.

In response to a determination at block 406 that an adjustment is to be made, the controller 102 may adjust, for instance, a setting of the heating lamp(s) 104, 210 to either increase or decrease the illumination level of the light 130, 214 emitted from the heating lamp(s) 104, 210. In addition or as another example, the controller 102 may adjust a setting of the laser source 106 to either increase or decrease the energy level of the laser beam 140.

At block 410, the controller 102 may activate the heating lamp(s) 104, 210 to output light 130, 214 at one of a normal setting and an adjusted setting. Particularly, the controller 102 may activate the heating lamp(s) 104, 210 to heat an area 134 of the layer of build materials 132 to a temperature that is between about 100° C. to about 400° C. below a melting temperature of the build materials 206. The heating lamp(s) 104, 210 may be activated as discussed above with respect to block 304 in FIG. 3.

At block 412, the controller 102 may activate the laser source 106 to emit a laser beam 140 at one of a normal setting and an adjusted setting. Particularly, the controller 102 may activate the laser source 106 to emit the laser beam 140 to melt the build materials 206 in the portion 142 of the area 134 of the layer of build materials 132. The laser source 106 may be activated as discussed above with respect to block 306 in FIG. 3. In addition, while the laser source 106 is active, the controller 102 may control the laser source 106 to move the laser beam 140 and thus melt different portions 142 of the layer of build materials 132.

At block 414, the controller 102 may deactivate the laser source 106. For instance, the controller 102 may deactivate the laser source 106 following a predefined time period after the laser source 106 has been activated. The predefined time period may be timed with respect to a length of time that the heating lamp 104 may be continuously activated without sintering the build materials 206 and/or requiring charging. For instance, the controller 102 may deactivate the laser source 106 prior to expiration of a time period that was previously determined to result in the build materials 206 beginning to sinter or melt at the level of heat applied by the heating lamp 104.

At block 416, the controller 102 may deactivate the heating lamp(s) 104, 210. The controller 102 may deactivate the heating lamp(s) 104, 210 after a predetermined time period following the deactivation of the laser source 106. For instance, the controller 102 may deactivate the heating lamp(s) 104, 210 after about 10 milliseconds to about 1 second after the laser source 106 has been deactivated.

Figure 5:
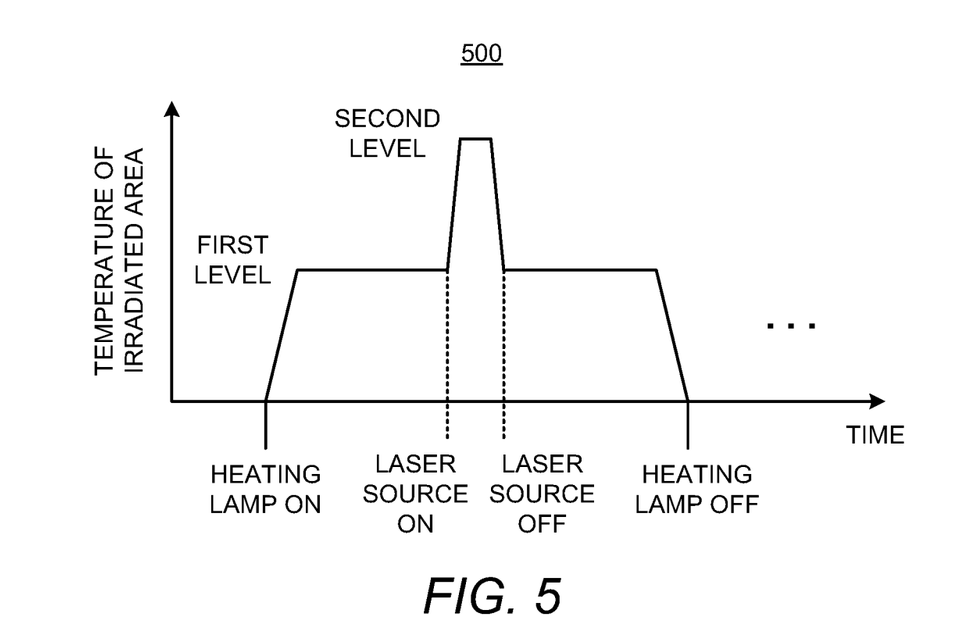
FIG. 5 shows an example graph representing the temperature of an irradiated area as a function of time.

An example graph 500 representing the temperature of the irradiated area 134 as a function of time is shown in FIG. 5. The graph 500 generally shows how the temperature of the area 134 changes as blocks 410-416 are implemented. For instance, at block 410, the heating lamp(s) 104, 210 may be activated, which may cause the temperature of the build materials 206 in the area 134 to rise to a first level, e.g., between about 100° C. to about 400° C. below a melting temperature of the build materials 206. At block 412, the laser source 106 may be activated, which may cause the temperature of the build materials 206 in the portion 142 of the area 134 to rise to a second level, e.g., a melting temperature of the build materials 206. In addition, at block 414, when the laser source 106 is deactivated, the temperature of the build materials 206 in the area 134 may return to the first level since the heating lamp(s) 104, 210 may still be active. At block 416, when the heating lamp(s) 104, 210 is deactivated, the temperature of the build materials 206 in the area 134 may return to a level below the first level.

With reference back to FIG. 4, at block 418, the controller 102 may determine whether the method 400 is to continue. For instance, the controller 102 may determine whether an additional portion 142 of the layer of build materials 132 includes build materials 206 that are to be fused together. In addition, the controller 102 may determine whether portions 142 of build materials 106 are to be fused together in an additional layer of build materials 206. In response to a determination that the method 400 is to continue and that an additional portion 142 of the layer of build materials 132 is to be fused together, which is equivalent to the "no" condition at block 420, the controller 102 may repeat blocks 410-418. Thus, for instance, the temperature changes over time depicted in the graph 500 may be repeated for the area 134 or other areas 134 on the layer of build materials 132.

Additionally, in response to a determination that the method 400 is to continue and that an additional portion 142 of another layer of build materials 132 is to be fused together, which is equivalent to the "yes" condition at block 420, the controller 102 may control the recoater 208 to apply another layer of build materials on top of the previous layer of build materials 132. The controller 102 may also repeat blocks 402-420 until the controller 102 determines at block 418 that the method 400 is to be discontinued. At that point, the controller 102 may end the method 400 as indicated at block 422.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions, and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a xenon heating lamp to illuminate and heat an area of a layer of build materials, wherein the build materials are one of a metallic and a plastic powder;
   a laser source to generate a laser beam; and
   a controller to control the xenon heating lamp to heat the build materials in the area of the layer of build materials to a temperature that is between 100° C. to 400° C. below a temperature at which the build materials begin to melt and to control the laser source to output a laser beam to melt the build materials in a portion of the heated area of the layer of build materials.

2. The apparatus of claim 1, wherein the controller is to activate the xenon lamp to output light in pulses.

3. The apparatus of claim 1, wherein the controller is to activate the xenon lamp to output light in a continuous wave.

4. The apparatus of claim 1, wherein the controller is to activate the xenon heating lamp to heat the area of the layer of build materials immediately prior to activation of the laser source and to deactivate the xenon heating lamp immediately following deactivation of the laser source.

5. The apparatus of claim 1, further comprising:
   a temperature sensor to detect a temperature of the build materials; and
   wherein the controller is to adjust at least one of an illumination level of the xenon heating lamp and an energy level of the laser beam outputted from the laser source based upon the detected temperature.

6. The apparatus of claim 1, wherein the controller is to control the xenon heating lamp to heat only the area of the layer of build materials.

7. A method comprising:
   applying a layer of build materials, wherein the build materials are one of a metallic powder and a plastic powder;
   activating a xenon heating lamp to heat an area of the layer of build materials to a temperature of between 100° C. to 400° C. below a melting temperature of the build materials; and
   activating a laser source to apply a laser beam to melt the build materials in a portion of the heated area of the layer of build materials.

8. The method of claim 7, wherein the build materials are the metallic powder.

9. The method of claim 7, wherein activating the xenon heating lamp further comprises activating the xenon lamp to output light in one of pulses and a continuous wave.

10. The method of claim 7, wherein activating the xenon heating lamp further comprises activating the xenon heating lamp to heat the layer of build materials immediately prior to activation of the laser source, said method further comprising:
    deactivating the laser source; and
    deactivating the xenon heating lamp immediately following deactivation of the laser source.

11. The method of claim 7, further comprising detecting a temperature of the build materials in a location surrounding and larger than the portion of the area of the heated layer of build materials and adjusting at least one of an illumination level of the xenon heating lamp and an energy level of the laser beam outputted from the laser source based upon the detected temperature.

12. A three-dimensional printer comprising:
    a recoater to apply a layer of build materials over a print bed, wherein the build materials are one of a metallic and a plastic powder;
    a xenon lamp to illuminate and heat an area of the applied layer of build materials;
    a laser source to generate a laser beam; and
    a controller to control the xenon lamp to heat the build materials in the area of the layer of build materials to a temperature that is between 100° C. to 400° C. below a temperature at which the build materials begin to melt and to control the laser source to output a laser beam to melt the build materials in a portion of the area of the heated layer of build materials.

13. The three-dimensional printer of claim 12, wherein the controller is further to control the xenon lamp to output light having a strobe effect during application of the laser beam and to deactivate the xenon lamp immediately following deactivation of the laser beam.

14. The method of claim 10, wherein the activating of the xenon heating lamp occurs less than a second to 5 seconds prior to the activation of the laser source, and wherein the deactivating of the xenon heating lamp occurs less than a second to 2 seconds after the deactivating of the laser source.

15. The method of claim 8, wherein the metallic powder comprises Cu powder.

\* \* \* \* \*